United States Patent
Katakura et al.

(10) Patent No.: US 11,655,034 B2
(45) Date of Patent: May 23, 2023

(54) AIRCRAFT SEAT UNIT

(71) Applicant: JAMCO CORPORATION, Tokyo (JP)

(72) Inventors: Sachiko Katakura, Tokyo (JP); Hisaya Hagiwara, Tokyo (JP); Ken Kimizuka, Tokyo (JP); Rei Kigoshi, Evanston, IL (US); Michio Kinoshita, Tokyo (JP); Manabu Matsumoto, Tokyo (JP); Amon Igari, Tokyo (JP); Yuichi Akutsu, Tokyo (JP)

(73) Assignee: JAMCO CORPORATION, Tokyo (JP)

( * ) Notice: Subject to any disclaimer, the term of this patent is extended or adjusted under 35 U.S.C. 154(b) by 0 days.

(21) Appl. No.: 17/058,778

(22) PCT Filed: Jun. 12, 2018

(86) PCT No.: PCT/JP2018/022400
§ 371 (c)(1),
(2) Date: Nov. 25, 2020

(87) PCT Pub. No.: WO2019/239480
PCT Pub. Date: Dec. 19, 2019

(65) Prior Publication Data
US 2021/0197973 A1    Jul. 1, 2021

(51) Int. Cl.
*B64D 11/06*    (2006.01)

(52) U.S. Cl.
CPC ...... *B64D 11/0612* (2014.12); *B64D 11/0601* (2014.12); *B64D 11/0606* (2014.12); *B64D 11/0636* (2014.12)

(58) Field of Classification Search
CPC ............ B64D 11/0601; B64D 11/0606; B64D 11/0612; B64D 11/0627; B64D 11/0636; B60R 7/04; B60R 7/043; A47C 7/62
See application file for complete search history.

(56) References Cited

U.S. PATENT DOCUMENTS 3,735,430 A * 5/1973 Platz ................. A47D 9/005
                                                  5/118
4,681,367 A * 7/1987 Timmers ............ B60R 22/105
                                                  297/188.1
(Continued)

FOREIGN PATENT DOCUMENTS

FR         2575711      * 7/1986 ............... B60R 7/08
JP       H11-043099 A     2/1999
(Continued)

OTHER PUBLICATIONS

International Search Report (Form PCT/ISA/210) dated Sep. 11, 2018, issued in counterpart International Application No. PCT/JP2018/022400, w/English translation.
(Continued)

*Primary Examiner* — Joshua J Michener
*Assistant Examiner* — Ka Chun Leung
(74) *Attorney, Agent, or Firm* — Renner, Otto, Boisselle & Sklar, LLP

(57) ABSTRACT

The aircraft seat unit includes a first seat 13, a second seat 14, an intermediate portion 15 disposed between the first seat 13 and the second seat 14, and a front wall 11 adjacent to the intermediate portion 15. An axis line X1 of the first seat 13 and an axis line X2 of the second seat 14 are respectively disposed at angles that are oriented in mutually opposite directions with respect to a traveling direction. The intermediate portion 15 is disposed in a space between the first set and the second seat and is capable of supporting a load of a bassinet 30 placed thereon. The front wall 11 includes engagement holes 11e that detachably engage with engagement portions 32 of the bassinet 30.

10 Claims, 9 Drawing Sheets

(56) References Cited

U.S. PATENT DOCUMENTS

| | | | |
|---|---|---|---|
| 5,123,377 A * | 6/1992 | Edwards | A01K 1/0272 119/28.5 |
| 5,344,212 A * | 9/1994 | Muller | B64D 11/06 297/14 |
| 6,264,261 B1 * | 7/2001 | Krafcik | B60R 7/04 297/256.16 |
| 7,530,635 B2 * | 5/2009 | Schramek-Flye | B60N 2/2863 297/254 |
| 10,793,031 B1 * | 10/2020 | Daniels | B60N 2/2893 |
| 2007/0170310 A1 | 7/2007 | Bock | |
| 2007/0246981 A1 | 10/2007 | Plant | |
| 2010/0107331 A1 * | 5/2010 | Negre | A47D 7/04 5/94 |
| 2010/0252680 A1 * | 10/2010 | Porter | B60R 7/043 244/118.6 |
| 2011/0210205 A1 | 9/2011 | Bock | |
| 2012/0025018 A1 | 2/2012 | France | |
| 2015/0144671 A1 * | 5/2015 | Seifert | B60R 7/043 224/539 |

FOREIGN PATENT DOCUMENTS

| | | | |
|---|---|---|---|
| JP | 2007523002 A | 8/2007 | |
| JP | 2009534248 A | 9/2009 | |
| WO | WO-9726811 A1 * | 7/1997 | A47C 7/68 |
| WO | 2011089566 A1 | 7/2011 | |
| WO | WO-2018178246 A1 * | 10/2018 | B64D 11/0601 |

OTHER PUBLICATIONS

Written Opinion (Form PCT/ISA/237) dated Sep. 11, 2018, issued in counterpart International Application No. PCT/JP2018/022400.

* cited by examiner

AIRCRAFT SEAT UNIT

TECHNICAL FIELD

The present invention relates to an aircraft seat unit.

BACKGROUND OF THE INVENTION

In recent years, the diversification of passengers using aircraft is progressing, and, for example, the number of cases in which families accompanied by infants board aircraft is increasing. In response to this, when a passenger accompanied by an infant is on board, for example, services are already provided in which a baby bed known as a bassinet is attached to the body of the aircraft, such that the infant can lie down thereon.

The bassinet illustrated in Patent Document 1 is attached to the inside of a clothing dresser door provided in business class or first class, and is used in a state in which the door is opened. On the other hand, in the economy class, a bassinet is attached to a wall near (usually in front of) a seat used by a family member in many cases.

CITATION LIST

Patent Document

[Patent Document 1] Japanese Translation of JP Publication No. 2007-523002

SUMMARY OF INVENTION

Technical Problem

Incidentally, although the weight of infants who can use the bassinet is limited in consideration of the strength of the door, the wall, or the like to which the bassinet is attached, there are requests for letting heavier infants sleep in the bassinet. However, in order to alleviate the baby weight limitation of the bassinet, it becomes necessary to reinforce doors, walls, and the like, which may lead to an increase in the weight of the aircraft and a corresponding decrease in the flight crew.

On the other hand, in the case of a passenger accompanied by an infant, since the infant occupies one seat, the fee for an adult or an amount close to that fee is charged, resulting in an excessive economic burden on passengers. Furthermore, since family members accompanied by infants are not always on board, from the viewpoint of maintaining seat occupancy rates, it is difficult to provide a structure exclusively for infants.

In addition, when performers or the like board aircraft, for example, there are requests to place musical instruments or the like owned by the performer within eyesight, for fear of theft or damage. However, since there is an upper limit on the size of musical instruments or the like that can be brought into the aircraft, there are problems in that musical instruments exceeding the upper limit must be checked in at the baggage counter, and the anxiety of passengers cannot be alleviated because the musical instruments or the like are transported separately from the passengers.

It is therefore an object of the present invention to provide an aircraft seat unit that can handle the diversification of passengers and effectively utilize the space in the passenger cabin.

Means For Solving the Problems

In order to achieve the above object, the aircraft seat unit according to the present invention includes a first seat; a second seat; an intermediate portion disposed between the first seat and the second seat; and a wall portion adjacent to the intermediate portion, wherein: an axis line of the first seat and an axis line of the second seat are respectively disposed at angles that are oriented in mutually opposite directions with respect to a traveling direction; the intermediate portion is disposed in a space between the first seat and the second seat and is capable of supporting a load of a restrained body placed thereon; and the wall portion includes a wall connection portion detachably connected to a device connection portion of a restraining device that restrains the restrained body placed on the intermediate portion.

Advantageous Effects of Invention

According to the present invention, it is possible to provide an aircraft seat unit that can handle the diversification of passengers and effectively utilize the space in the passenger cabin.

DESCRIPTION OF EMBODIMENT(S)

Embodiments of the present invention will be described below with reference to the drawings. In the present specification, the "restraining device" refers to a device which exhibits a function for restraining a restraining body. The term "restrained body" includes not only human bodies, but also objects. The term "restraining" includes not only restraining the restrained body by a belt, string, or the like, but also holding the restrained body in a state of being housed within housing equipment. In addition, the terms "forward" and "rearward" refer to the traveling direction of the aircraft and a direction opposite to the traveling direction of the aircraft, respectively.

Figure 1:
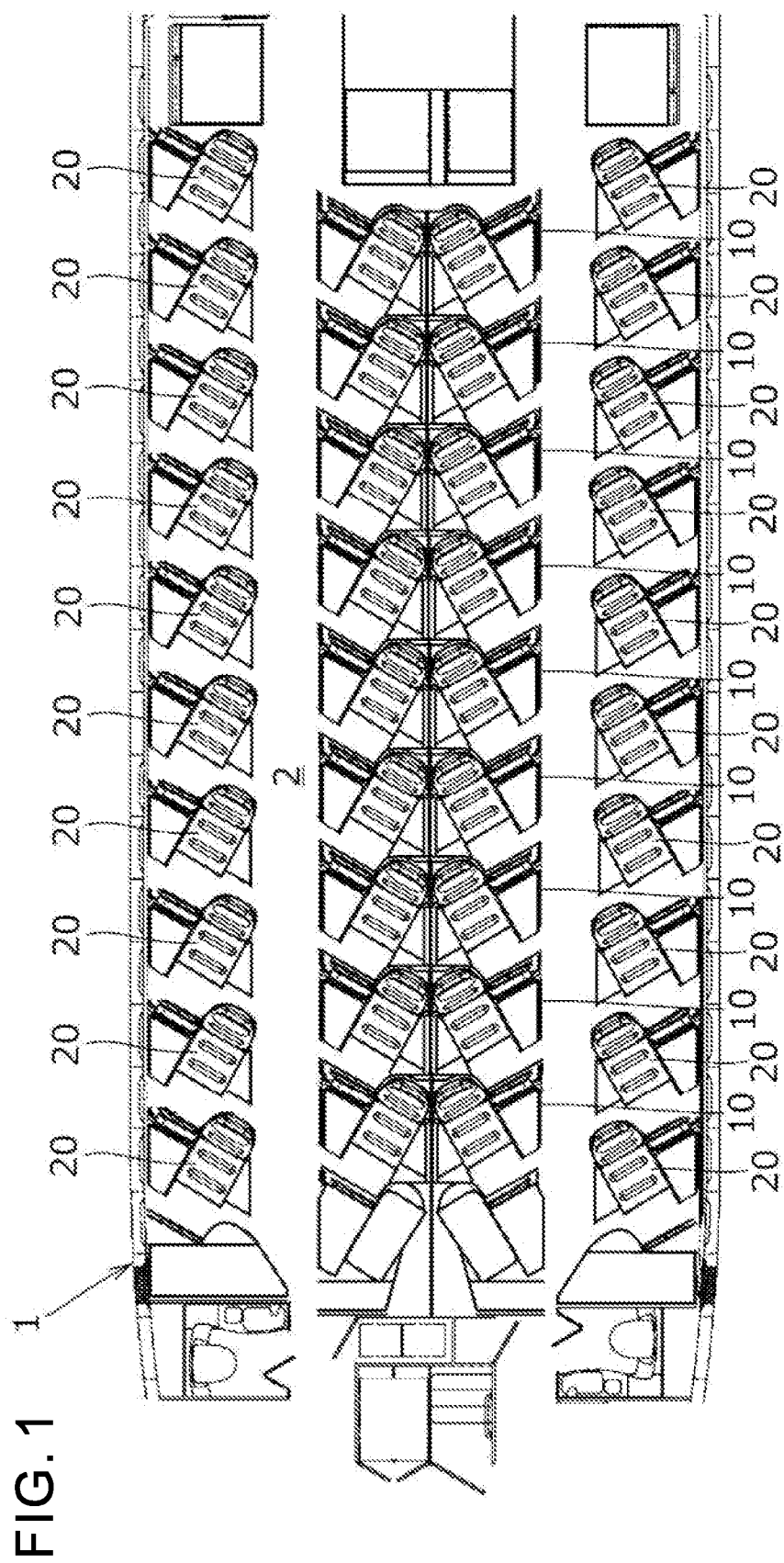
FIG. 1 is a top view illustrating an overview of the passenger cabin of an aircraft equipped with an aircraft seat unit according to the present embodiment.

FIG. 1 is a top view illustrating an overview of a passenger cabin of an aircraft equipped with an aircraft seat unit according to the present embodiment. In FIG. 1, the left side in the figure is the leading side of the aircraft and the right side is the rear side of the aircraft. The aircraft 1 has a plurality of aircraft seat units 10 arranged in a line on the floor 2 in the center, and single seats 20 are arranged in a row on both window sides, respectively.

Figure 2:
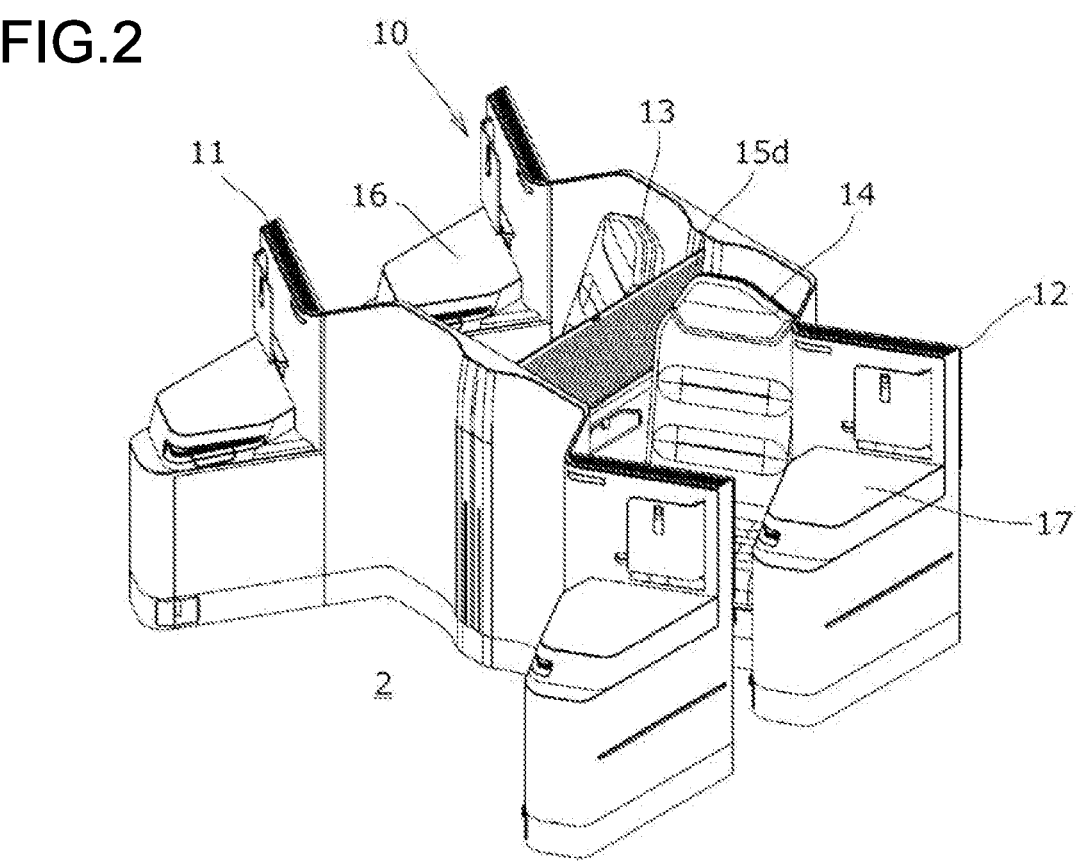
FIG. 2 is a perspective view of an aircraft seat unit 10 as viewed from diagonally above.
Figure 3:
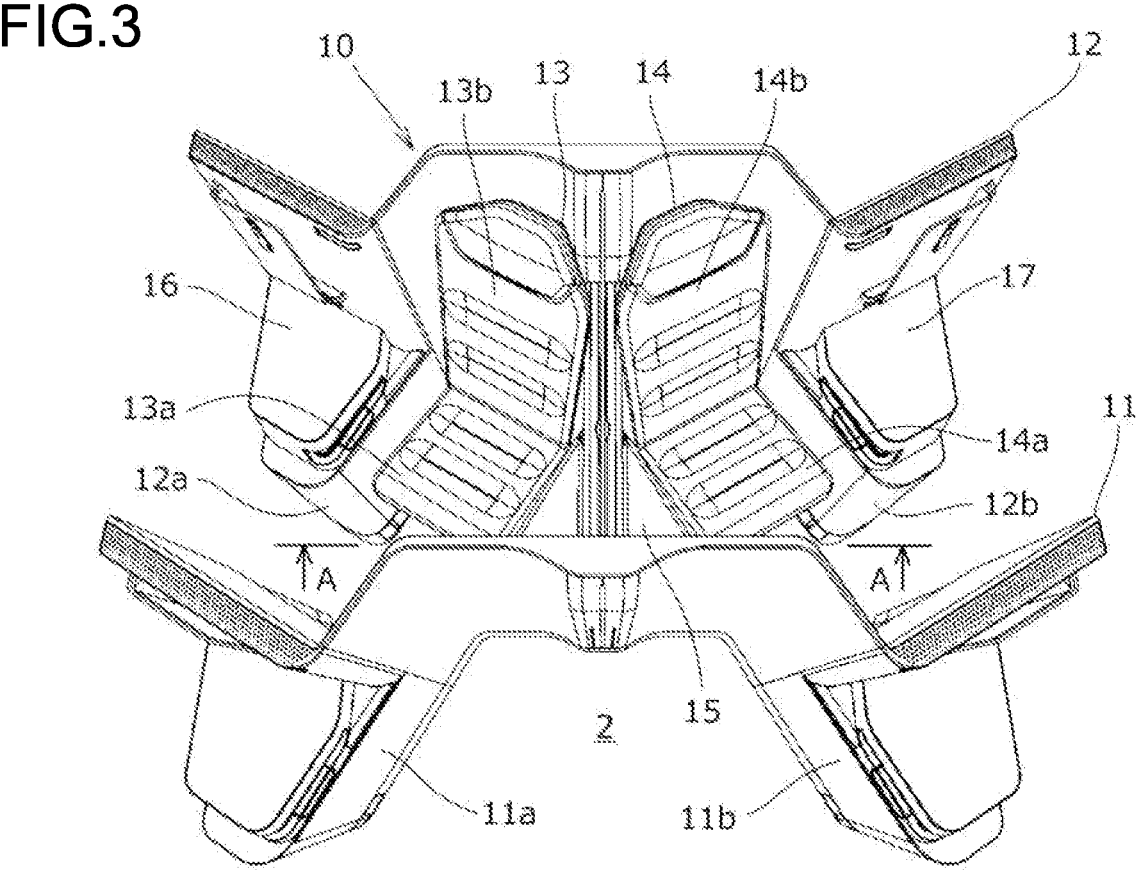
FIG. 3 is a perspective view of an aircraft seat unit 10 as viewed from above and in front.
Figure 4:
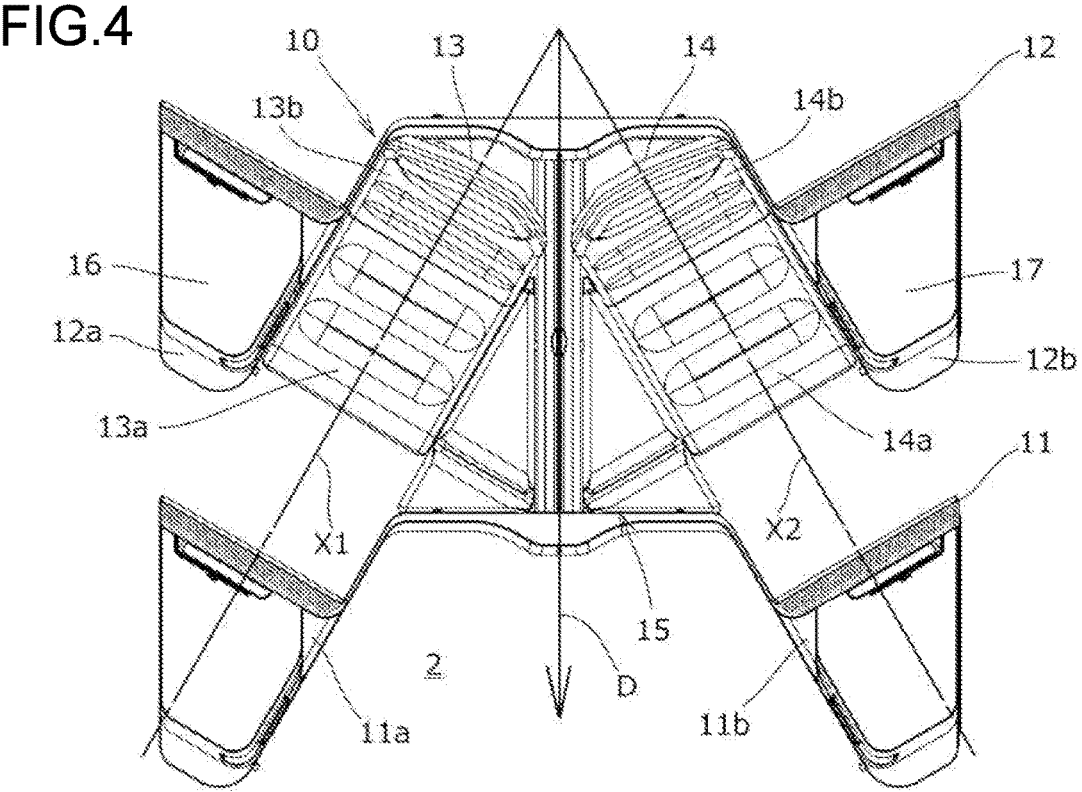
FIG. 4 is a diagram illustrating an aircraft seat unit 10 as viewed from directly above, and illustrates a seat state.
Figure 5:
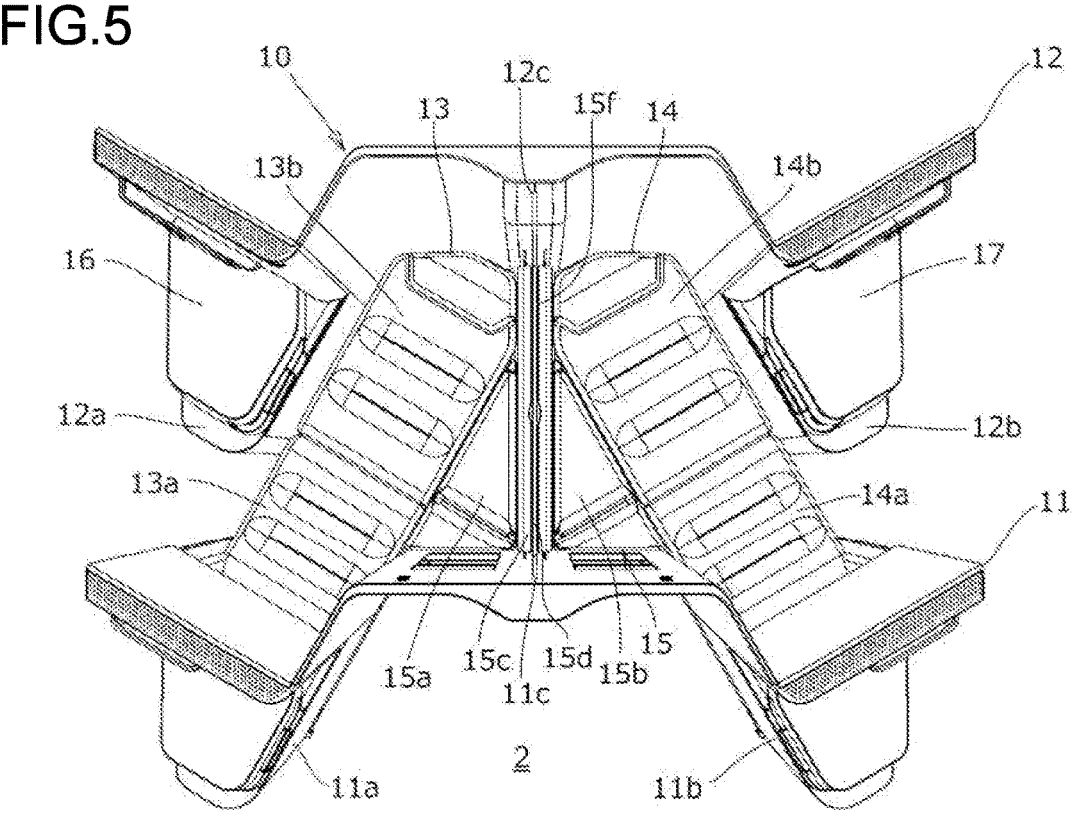
FIG. 5 is a diagram illustrating an aircraft seat unit 10 as viewed from directly above, and illustrates a bed state.

FIG. 2 is a perspective view of an aircraft seat 10 as viewed from diagonally above. FIG. 3 is a perspective view of an aircraft seat unit 10 as viewed from above and in front. FIG. 4 is a diagram illustrating an aircraft seat unit 10 as viewed from directly above, and illustrates a seat state. FIG. 5 is a diagram illustrating an aircraft seat unit 10 as viewed from directly above, and illustrates a bed state.

In FIG. 2 and FIG. 3, the aircraft seat unit 10 includes a front wall 11 and a rear wall 12 which are erected from the floor 2 in parallel, a first seat 13 and a second seat 14 arranged adjacent to each other on the floor 2 between the front wall 11 and the rear wall 12, an intermediate portion 15 arranged between the first seat 13 and the second seat 14, a first side table 16 arranged beside the first seat 13, and a second side table 17 arranged beside the second seat 14.

The front wall 11 and the rear wall 12 have a common shape. Due to this, the rear wall 12 of the front side seat unit 10 can also serve as the front wall 11 of the rear side seat unit 10 adjacent thereto. For convenience of description, the seat unit 10 is described as having a front wall 11 and a rear wall 12. However, in practice, the first seat 13, the second seat 14, and the rear wall 12 are supplied from the interior manufacturer as a single seat unit set, and by arranging them in front and behind each other and attaching them to the aircraft 1, the rear wall 12 can also be used as the front wall 11.

The front wall 11 has, on both sides thereof, trapezoidal columnar protruding portions 11a and 11b protruding forward. Similarly, the rear wall 12 has, on both sides thereof, trapezoidal columnar protruding portions 12a and 12b protruding forward. The interior of the protruding portions 12a, 12b of the rear wall 12 is hollow, the first side table 16 is placed on an upper surface of the protruding portion 12a, and the second side table 17 is placed on an upper surface of the protruding portion 12b. The same applies to the front wall 11.

As illustrated in FIG. 4, the front wall 11 and the rear wall 12 have a substantially W like shape when viewed from above. In addition, the axis line X1 of the first seat 13 and the axis line X2 of the second seat 14 are respectively disposed at angles that are oriented in mutually opposite directions with respect to the traveling direction D of the aircraft 1. As a result, it is possible to reduce the dimensions of the first seat 13 and second seat 14 along the traveling direction D when in the bed state (FIG. 5), and a large number of seat units can be mounted on the aircraft 1. On the other hand, by arranging the first seat 13 and the second seat 14 in such a manner, a substantially triangular prism-shaped space is created between the first seat 13 and the second seat 14. The intermediate portion 15 is provided by utilizing this space in order to make effective use of the space.

The intermediate portion 15 is disposed in the triangular prism-shaped space between the front wall 11, the first seat 13, and the second seat 14 so as to be in contact therewith. Although the first seat 13 and the second seat 14 have the same structure, they may also be different from each other. It should be noted that the first seat 13 or the second seat 14 may be used as the seat 20 on the window side.

The first seat 13 has a first seating portion 13a and a first backrest 13b. The first backrest 13b is pivotally connected to the rear end of the first seating portion 13a. By means of a user operating a switch (not shown in the figures), a reclining mechanism 13c (see FIG. 6, which will be described later) is driven and controlled, and at the same time that the first backrest 13b reclines backward with respect to the first seating portion 13a, the first seating portion 13a slides horizontally forward, and the upper surfaces of the first seating portion 13a and the first backrest 13b become horizontally flat. This is referred to as the bed state (see FIG. 5). When in the bed state, a part of the first seating portion 13a enters the inside of the protruding portion 11a. That is, the inside of the protruding portion 11a becomes a part of the use space of the user, and the user can extend his/her feet and lie down on the first seat 13.

From this bed state, by means of the user operating the switch (not shown in the figures) in reverse, at the same time that the first backrest 13b rises with respect to the first seating portion 13a, the first seating portion 13a slides backward, and the first backrest 13b becomes angled with respect to the first seating portion 13a. This is referred to as the seat state (see FIG. 3, FIG. 4). In the seat state, the reclining mechanism 13c may slightly lift the front end of the first seating portion 13a. This allows the user to sit on the first seating portion 13a with a comfortable posture.

Similarly, the second seat 14 has a second seating portion 14a and a second backrest 14b. The second backrest 14b is pivotally connected to the rear end of the second seating portion 14a. By means of a user operating a switch (not shown in the figures), a reclining mechanism 14c (see FIG. 6, while will be described later) is driven and controlled, and at the same time that the second backrest 14b reclines backward with respect to the second seating portion 14a, the second seating portion 14a slides horizontally forward, and the upper surfaces of the second seating portion 14a and the second backrest 14b become horizontally flat. This is referred to as the bed state (see FIG. 5). When in the bed state, a part of the second seating portion 14a enters the inside of the protruding portion 11b. That is, the inside of the protruding portion 11b becomes a part of the use space of the user, and the user can extend his/her feet and lie down on the second seat 14.

From this bed state, by means of the user operating the switch (not shown in the figures) in reverse, at the same time that the second backrest 14b rises with respect to the second seating portion 14a, the second seating portion 14a slides backward, and the second backrest 14b becomes angled with respect to the second seating portion 14a. This is referred to as the seat state (see FIG. 3 and FIG. 4). In the seat state, the reclining mechanism 14c may slightly lift the front end of the second seating portion 14a. This allows the user to sit on the second seating portion 14a with a comfortable posture. It should be noted that, with regard to the reclining mechanisms 13c and 14c, the technique of Japanese Translation of PC International Application Publication No. 2010-520117 can be used.

In FIG. 5, the intermediate portion 15 includes a pedestal 15a that has a triangular prism shape disposed on the first seat 13 side, a pedestal 15b that has a triangular prism shape disposed on the second seat 14 side, a rectangular parallelepiped support portion 15c disposed between the pedestals 15a and 15b, and a partition plate 15d supported by the support portion 15c. The intermediate portion 15 is hollow but has a box-like structure and is light in weight but high in strength.

The support portion 15c and the partition plate 15d extend from the rear surface of the front wall 11 to the front surface of the rear wall 12. As illustrated in FIG. 5, the end portions of the partition plate 15d are engaged with a vertical groove 12c of the rear surface of the front wall 11 and a vertical groove 12c on the front surface of the rear wall 12, and can be raised and lowered by being guided by these.

Figure 6:
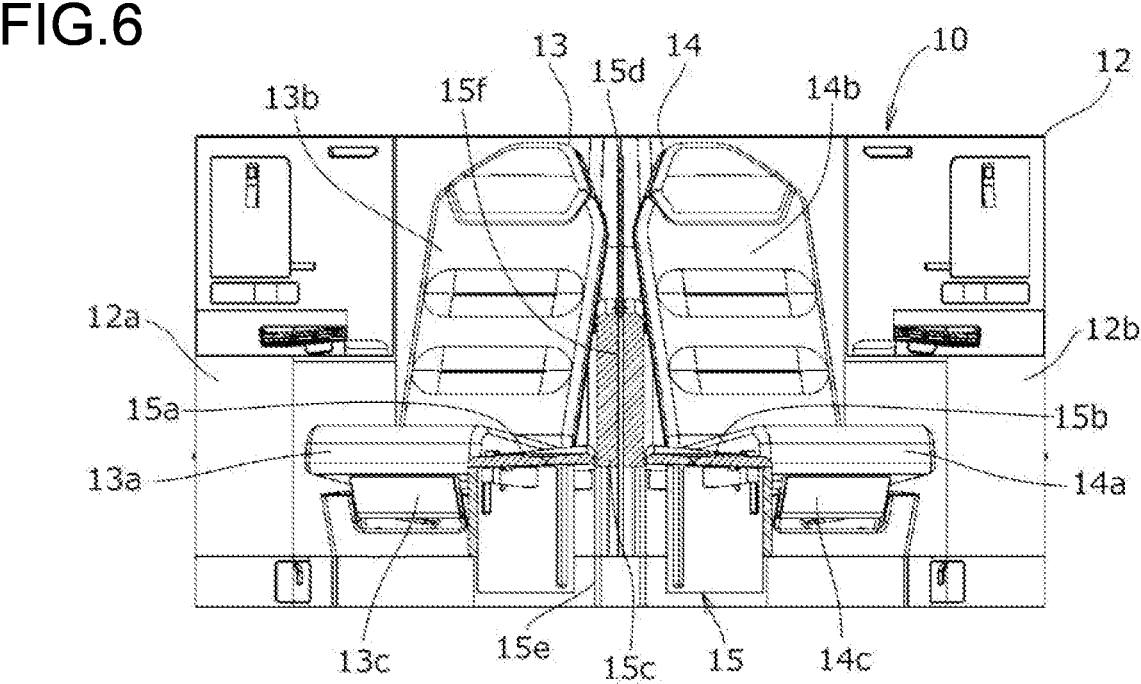
FIG. 6 is a cross-sectional view of the line A-A of FIG. 3, and illustrates a state in which the partition plate is raised to the maximum position (a shielded state).
Figure 7:
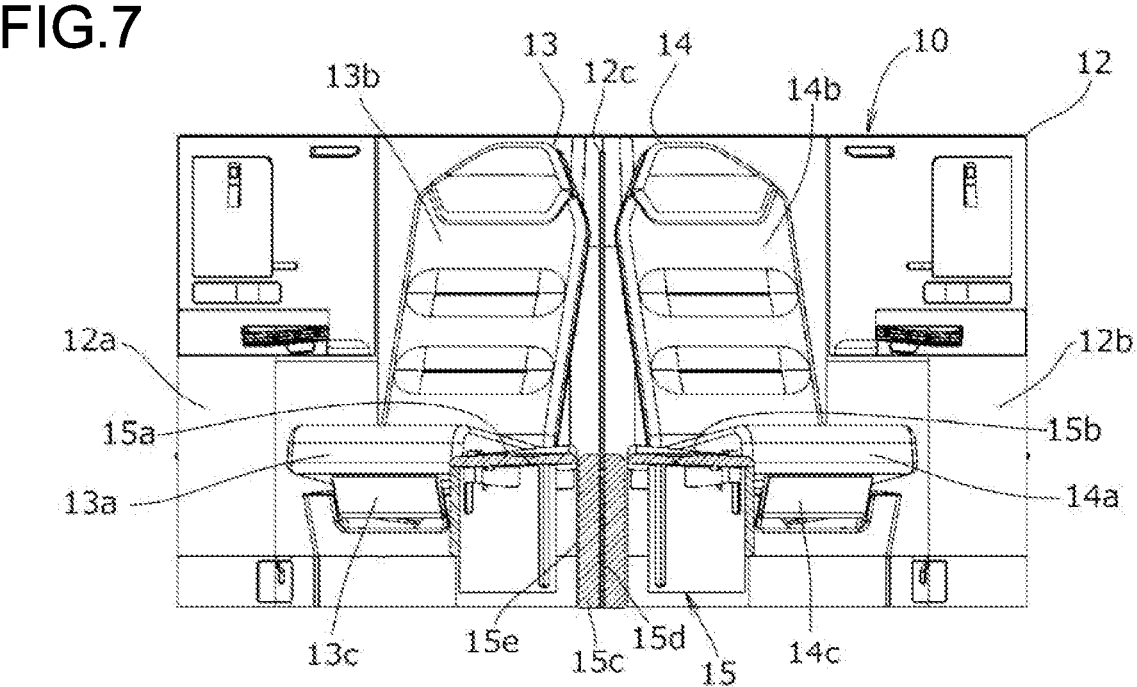
FIG. 7 is a cross-sectional view of the line A-A of FIG. 3, and illustrates a state in which the partition plate is housed in the intermediate portion (an open state).

FIG. 6 and FIG. 7 are cross-sectional views taken along the line A-A of FIG. 3. The pedestals 15a and 15b (FIG. 5) are fixed to the floor, and the upper surface thereof is covered with a material having cushion properties in the same way as the seating portion. The support portion 15c is disposed along the guide 15e between the pedestals 15a and 15b so as to be slidable in the vertical direction. Each of the pedestals 15a and 15b may be composed of a plurality of members.

The support portion 15c, which is covered with a material having cushion properties similar to the pedestals 15a and 15b, includes a slit 15f opening at the center of the upper surface. The partition plate 15d is disposed so as to be slidable in the vertical direction within the slit 15f. The partition plate 15d is preferably made of translucent or opaque resin, for example.

As an example, in the case that the users sitting in the first seat 13 and the second seat 14 are complete strangers, it is desirable to define a private space for each of the first seat and the second seat 14. In such a case, the user or an attendant manually or electrically slides the support portion 15c upward with respect to the pedestals 15a and 15b, and slides the partition plate 15d upward with respect to the support portion 15c. Such a state is referred to as a shielded state, and is illustrated in FIG. 2 and FIG. 6. In the shielded state, the upper end of the partition plate 15d is above the eye level (usually 10 cm or more below the upper end of the first backrest 13b or the second backrest 14b) of the users seated on the first seating portion 13a or the second seating portion 14a in the seat state. As a result, a private space for a user sitting in the first seat 13 or the second seat 14 is secured.

On the other hand, a user or an attendant can manually or electronically slide the support portion 15c downward with respect to the pedestals 15a and 15b, and slide the partition plate 15d downward with respect to the support portion 15c to house them internally. This state is referred to as an open state. In the open state, as illustrated in FIG. 7, the height positions of the upper surfaces of the pedestals 15a and 15b and the upper surface of the support portion 15c substantially coincide. In addition, the height of the upper surface of the support portion 15c and the height of the upper end of the partition plate 15d substantially coincide. That is, as illustrated in FIG. 7, the entire upper surface of the intermediate portion 15 has a uniform height.

While maintaining such a state, as illustrated in FIG. 5, when the first seat 13 and the second seat 14 are put into the bed state, the height of the first backrest 13b and the second backrest 14b substantially coincide with the height of the upper surface of the intermediate portion 15.

Then, a wide space having a flat upper surface formed by the first seat 13, the second seat 14, and the intermediate portion 15 is formed between the front wall 11 and the rear wall 12.

According to the present embodiment, by providing the support portion 15c, it is possible to lift the upper end of the partition plate 15d to a high position in the shielded state while retaining the intermediate portion 15 in a low position.

That is, supposing that there were no support portion 15c, in a case that the height of the upper surface of the intermediate portion 15 (the height of the upper end of the partition plate 15d) were made to coincide with the upper surface height of the first backrest 13b or the second backrest 14b in the bed state, the height of the partition plate 15d would only be twice the height of the intermediate portion 15 in the shielded state, at maximum. In such a case, since the height of the partition plate 15d in the shielded state falls below the eye level of a user sitting on the seating portion, it becomes impossible to secure a private space between the first seat 13 side and the second seat 14 side.

Accordingly, in the present embodiment, the intermediate portion 15 is provided with a support portion 15c in a two-stage lifting structure, the support portion 15c is slid with respect to the pedestals 15a and 15b, and the partition plate 15d is slid with respect to the support portion 15c. As a result, theoretically, it is possible to raise the upper end of the partition plate 15d up to a height position of approximately three times the height of the intermediate portion 15. It should be noted that, by providing a plurality of support portions, a three-stage or more lifting structure can be provided.

It should be noted that, when the restraining device to be described later is used, the partition plate 15d is housed in the intermediate portion 15. As a result, the restrained body can be restrained by the restraining device without being obstructed by the partition plate 15d.

Figure 8:
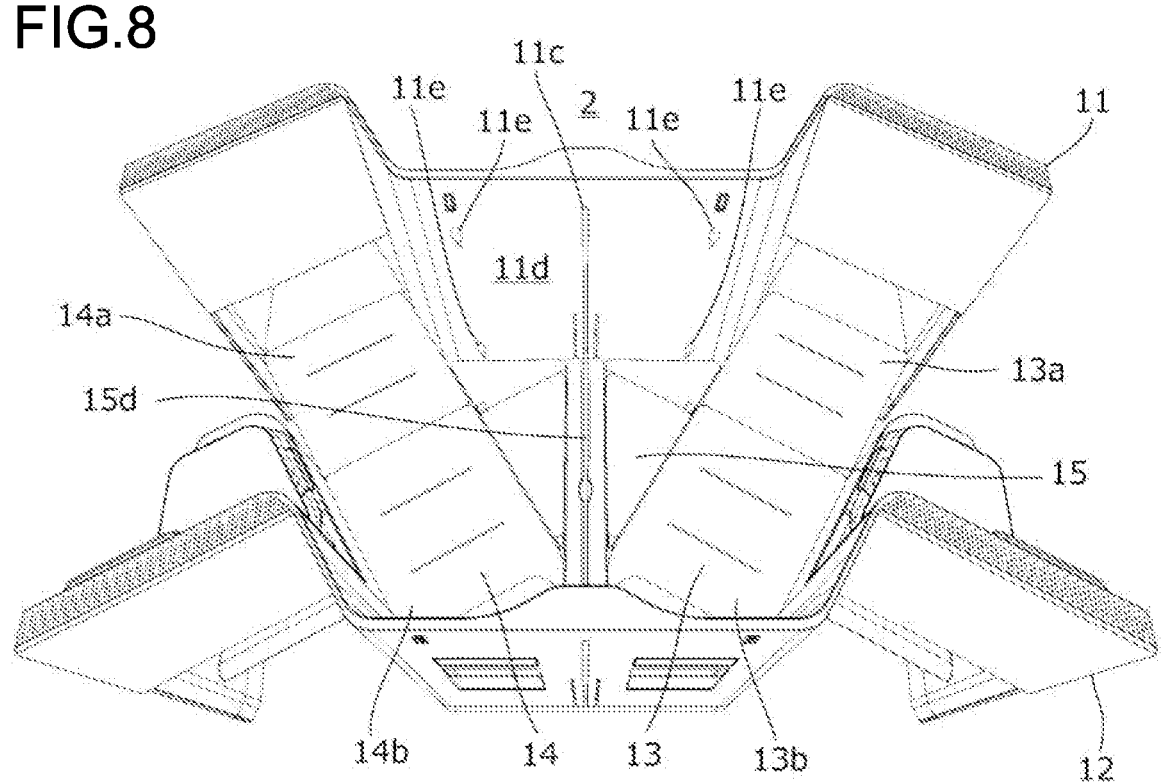
FIG. 8 is a view of a front wall 11 from above a rear wall 12.

FIG. 8 is a view of the front wall 11 from above the rear wall 12. In FIG. 8, the front wall 11 adjacent to the intermediate portion 15 has a panel (wall portion) 11d whose entire surface is substantially flat and which extends perpendicularly to the floor 2. Vertical grooves 11c are formed in the center of the panel 11d, and further, two engagement holes 11e (four in total) are formed near both ends of the panel 11d, respectively. The engagement holes 11e constitute a wall connection portion. The rear wall 12 may have a structure similar to that of the front wall 11.

Figure 9:
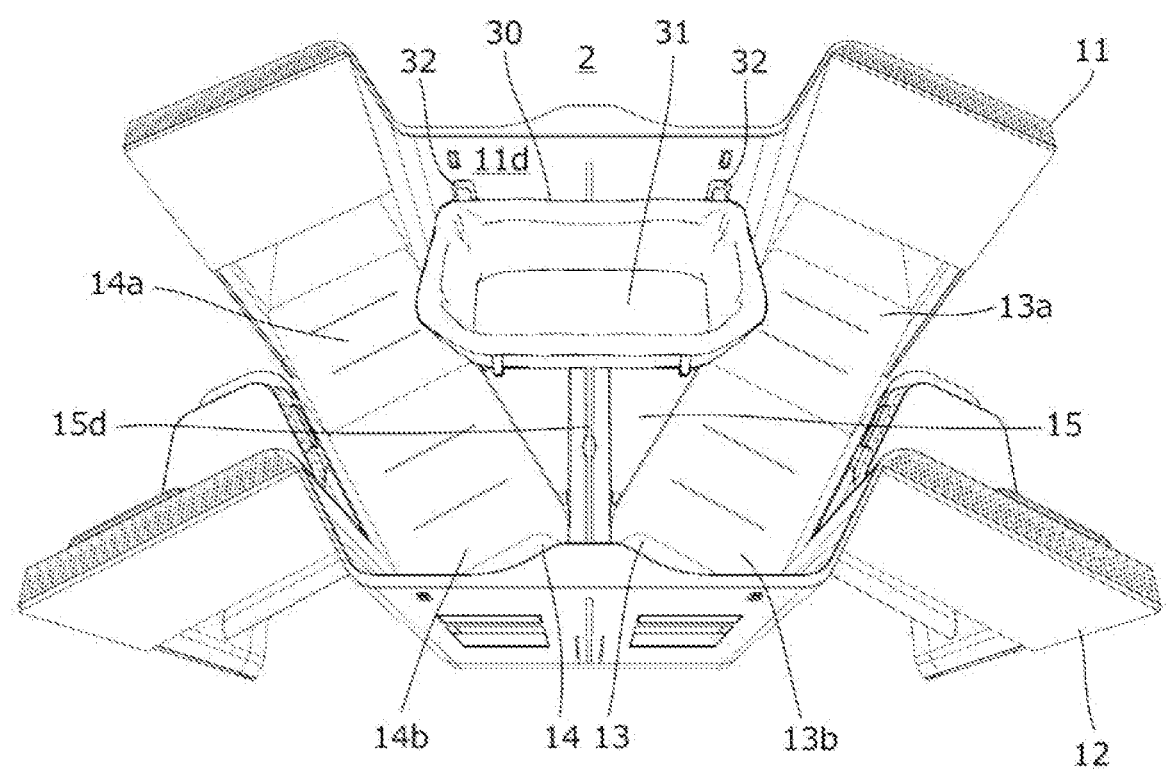
FIG. 9 illustrates a state in which a bassinet 30 is attached to the front wall 11, and is a view taken from the same viewpoint as in FIG. 8.

FIG. 9 illustrates a state in which a bassinet 30 is attached to the front wall 11, and is a view taken from the same viewpoint as in FIG. 8. The bassinet 30, which is an example of a restraining device, has a basket portion 31 having a bottom for laying down an infant (not illustrated in the figures) that serves as the restrained body, and an engagement portion 32 fixed to the basket portion 31 and connected to the engagement hole 11e. The engagement portion 32 constitutes the device connection portion. In addition, a belt for holding the infant in the bassinet 30, a shade for blocking light in the aircraft, or the like may be provided.

In the present embodiment, the engagement portion 32 can be connected to the panel 11d in a state in which the basket portion 31 is placed on an upper surface of the intermediate portion 15, as described later. As a result, the load in the vertical direction of the basket portion 31 when an infant is laid down can be supported by the intermediate portion 15.

Figure 10:
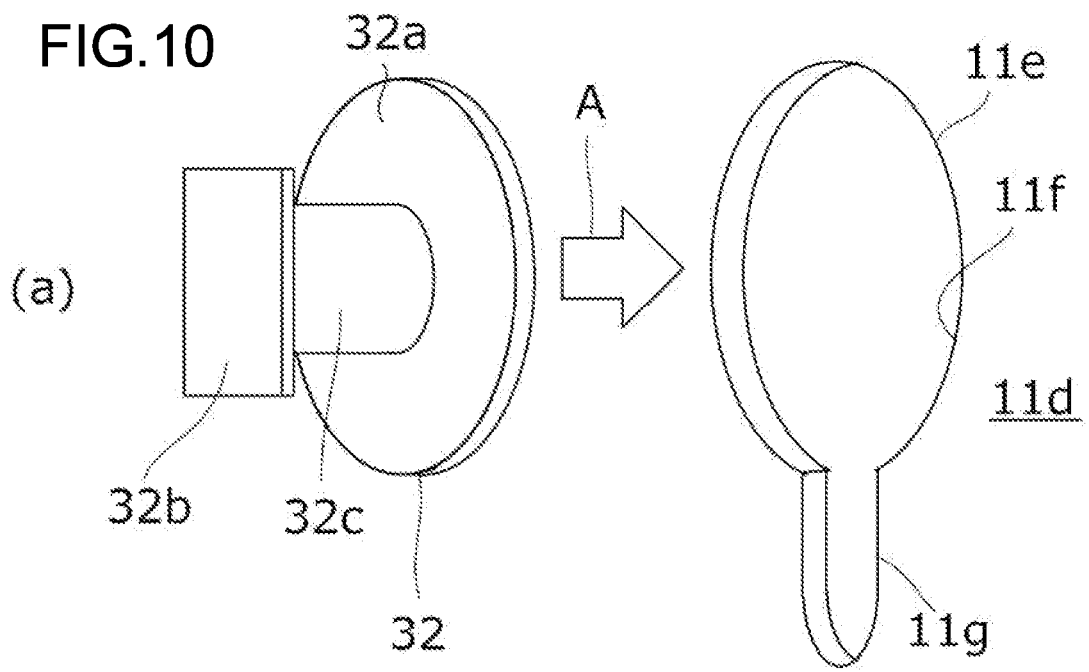
FIG. 10 is a perspective view illustrating an engagement hole 1 1e and an engagement portion 32.
Figure 10:
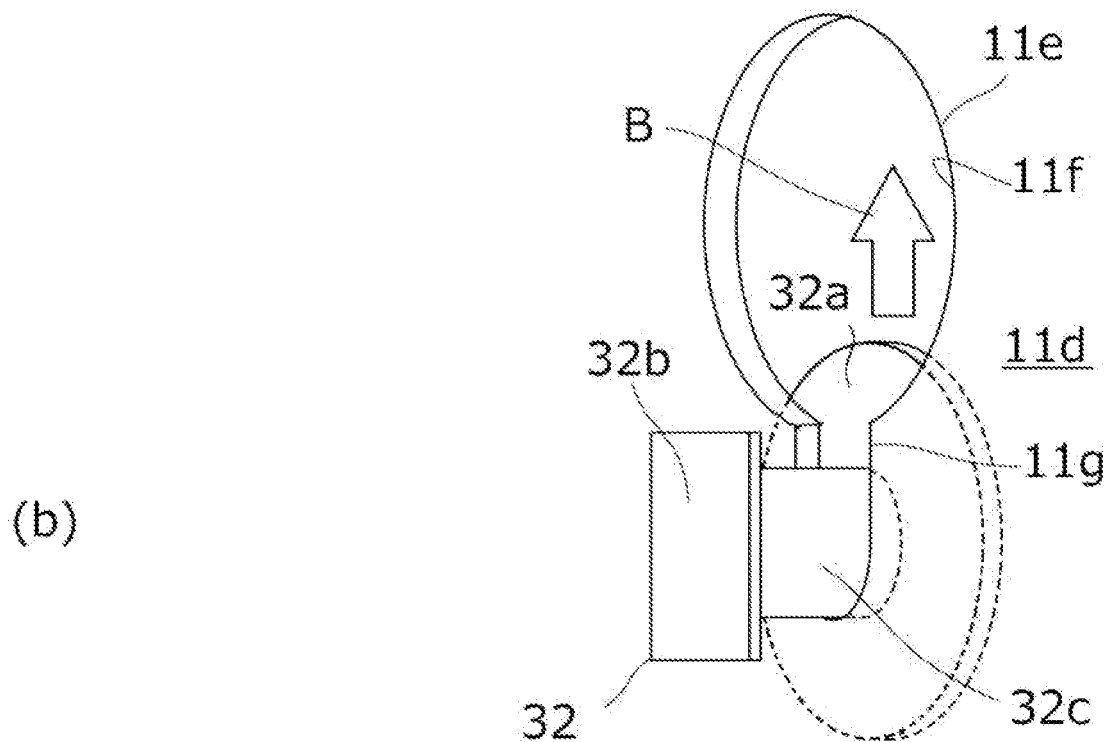

FIG. 10 is a perspective view illustrating the engagement holes 11e and the engagement portion 32, where (a) illustrates a separated state, and (b) illustrates an engaged state. The engagement holes 11e are formed in the metal plate that constitutes a part of the panel 11d, and include a circular insertion opening 11f, and a slit (or notch) 11g extending downward from the lower end of the insertion opening 11f.

On the other hand, the metal engagement portion 32 is integrally formed from a disk 32a, a holding portion 32b, and a cylindrical shaft 32c that connects between the disk 32a and the holding portion 32b. Although not illustrated in the figures, the holding portion 32b is connected to the vicinity of both of the longitudinal ends at the upper end of the basket portion 31 of the bassinet 30 (FIG. 9) directly or via a belt.

Here, the outer diameter of the disk 32a is smaller than the inner diameter of the insertion opening 11f, and is larger than the width of the slit 11g. In addition, the width of the slit 11g is larger than the outer diameter of the cylindrical shaft 32c. However, the wall connection portion and the device connection portion are not limited to the above structure, and any structure can be used provided it can be easily attached and detached and reliably connected.

Next, the engagement and separation of the engagement portion 32 with respect to the engagement holes 11e will be described. It should be noted that, when using the bassinet 30 of the present embodiment, the two engagement holes 11e below the panel 11d are not used, and only the upper two engagement holes 11e are used, but the bassinet 30 may be configured so as to use all the engagement holes 11e.

First, a passenger or a crew member who wants to use the bassinet 30 grips the basket portion 31 of the bassinet 30, and as illustrated in FIG. 10 (a), the disk 32a of the engagement portion 32 is made to face the insertion opening 11f of the panel 11d. When the basket portion 31 is brought close to the panel 11d as indicated by the arrow A while maintaining this state, the disk 32a passes through the insertion opening 11f.

In a state where the cylindrical shaft 32c has entered the insertion opening 11f, when the basket portion 31 is lowered, as illustrated in FIG. 10 (b), the cylindrical shaft 32c enters into the slit 11g, and is locked at its lower end. At this point, the engagement portion 32 is in a state in which it is engaged with the engagement hole 11e, and since the disk 32a having a large diameter is positioned inside the slit 11g, the engagement portion 32 will not fall out of the engagement hole 11e. As a result, the load in the horizontal direction received from the bassinet 30 can be supported by the panel 11d through the connected engagement portion 32.

On the other hand, when separating the engagement portion 32 from the engagement hole 11e, in contrast to the above description, when a passenger or crew member raises the basket portion 31 of the bassinet 30 while gripping it, the cylindrical shaft 32c rises along the slit 11g, as indicated by the arrow B in FIG. 10 (b). When the disk 32a is substantially coaxial with the insertion opening 11f, the disk 32a is separated from the insertion opening 11f by pulling the basket portion 31 horizontally forward. This allows the bassinet 30 to be removed from the panel 11d so that the space above the intermediate portion 15 can be used for various purposes.

In the present embodiment, the bassinet 30 is supported by the intermediate portion 15 in a state of being attached to the panel 11d. That is, since most of the vertical load resulting from adding the weight of the infant and the weight of the bassinet 30 is supported by the intermediate portion 15, the panel 11d does not need to be reinforced even if the weight of the infant is heavy, and therefore, the weight of the aircraft is not increased. On the other hand, when an impact is received at the time of takeoff or landing of the aircraft, or when the aircraft experiences turbulence or the like, the load in the horizontal direction of the bassinet 30 is supported by the panel 11d by the connection between the engagement hole 11e and the engagement portion 32 and sudden drops or the like do not occur, so that the safety of the passengers can be facilitated.

Figure 11:
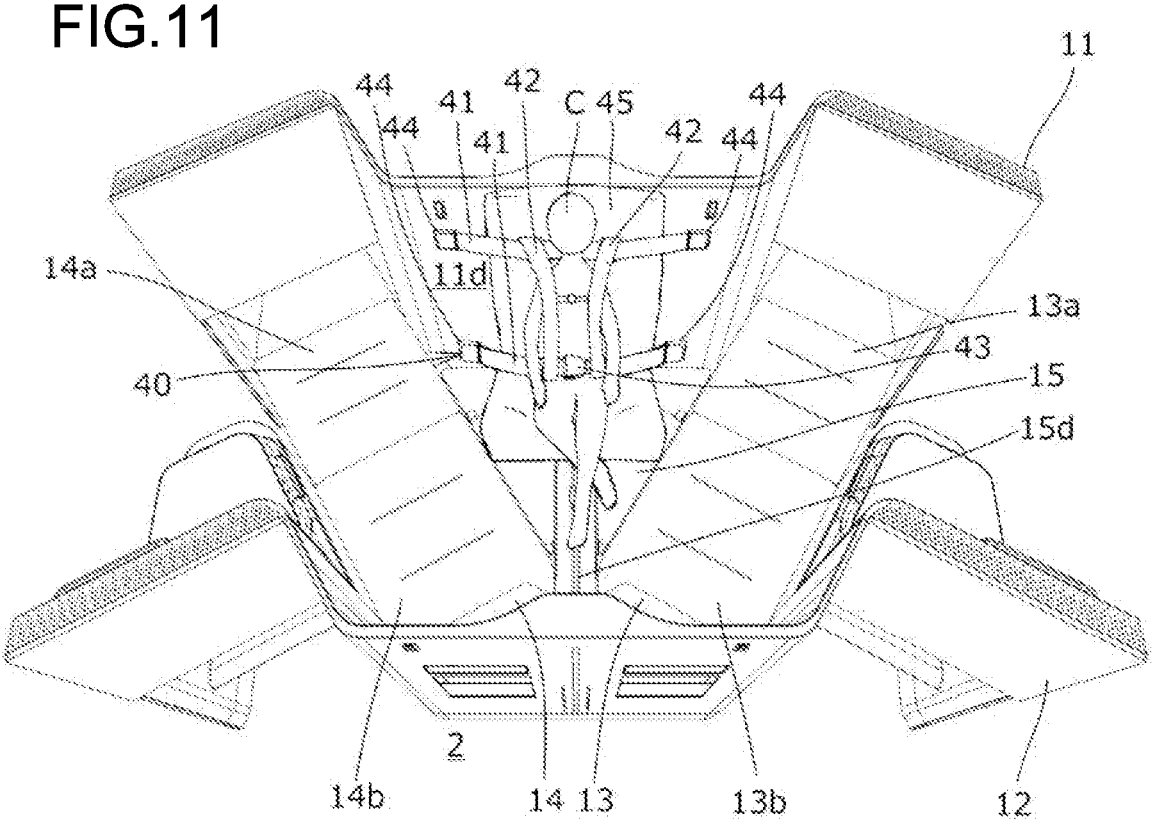
FIG. 11 illustrates a state in which a restraining belt 40 is attached to the front wall 11, and is a view taken from the same viewpoint as FIG. 8.

FIG. 11 illustrates a state in which a restraining belt 40 is attached to the front wall 11, and is a view taken from the same viewpoint as FIG. 8 The restraining belt 40, which is an example of a restraining device, primarily restrains and holds an infant C, which is a restrained body.

More specifically, the restraining belt 40 has two horizontal belts 41 and two vertical belts 42 with the upper and lower ends attached to the horizontal belt 41. The lower horizontal belt 41 has a buckle 43 at its center for connection and disconnection. In addition, at both ends of each horizontal belt 41, the engagement portion 44 is connected. Since the engagement portion 44 has a shared configuration with the engagement portion 32 of FIG. 10, a detailed description thereof will be omitted, but by engaging the engagement portion 44 with the engagement hole 11e (FIG. 10) of the panel 11d, the horizontal belt 41 is firmly connected to the panel 11d. The restraining belt 40 uses all four engagement holes 11e of the panel 11d.

When prompted to wear a seat belt, such as at the time of takeoff or landing of the aircraft, the infant C seated in the intermediate portion 15 has the vertical belt 42 put on both shoulders, the lower horizontal belt 41 wrapped around his/her waist, and the buckle 43 fastened. By using the restraining belt 40, the infant C can be securely restrained and held in a seating posture with respect to the panel 11d and the intermediate portion 15, such that the safety level is high. Since most of the body weight of the infant C is supported by the intermediate portion 15, the panel 11d receives only a relatively small load in the horizontal direction. Further, by disposing a cushion 45 or the like between the infant C and the panel 11d and the intermediate portion 15, it is possible to provide comfortable seating for the infant C.

On the other hand, while the aircraft is cruising normally, by removing the restraining belt 40 from the panel 11d, the space on the intermediate portion 15 can be used for a variety of purposes, such as a play space for the infant C. As a result, it becomes unnecessary to reserve a single seat for the infant C, and the economic burden on the passengers is reduced. It should be noted that the restraining belts 40 may be used to attach an ISOFIX child seat or pet-carry owned by a passenger.

As described above, when people who are complete strangers to each other sit in the first seat 13 and the second seat 14 as illustrated in FIG. 2 and FIG. 6, by lifting the support portion 15c and the partition plate 15d up to the shielded state, a private space can be secured. In other words, since the seat unit 10 can be commonly used regardless of whether the user is accompanied by an infant or not, the seat occupancy rate of the aircraft can be improved.

Further, the intermediate portion 15 may be used for placing a shogi board, a chess board, or the like, for example, when the passenger in the first seat 13 and the passenger in the second seat 14 wish to play a shogi game or a chess game.

Figure 12:
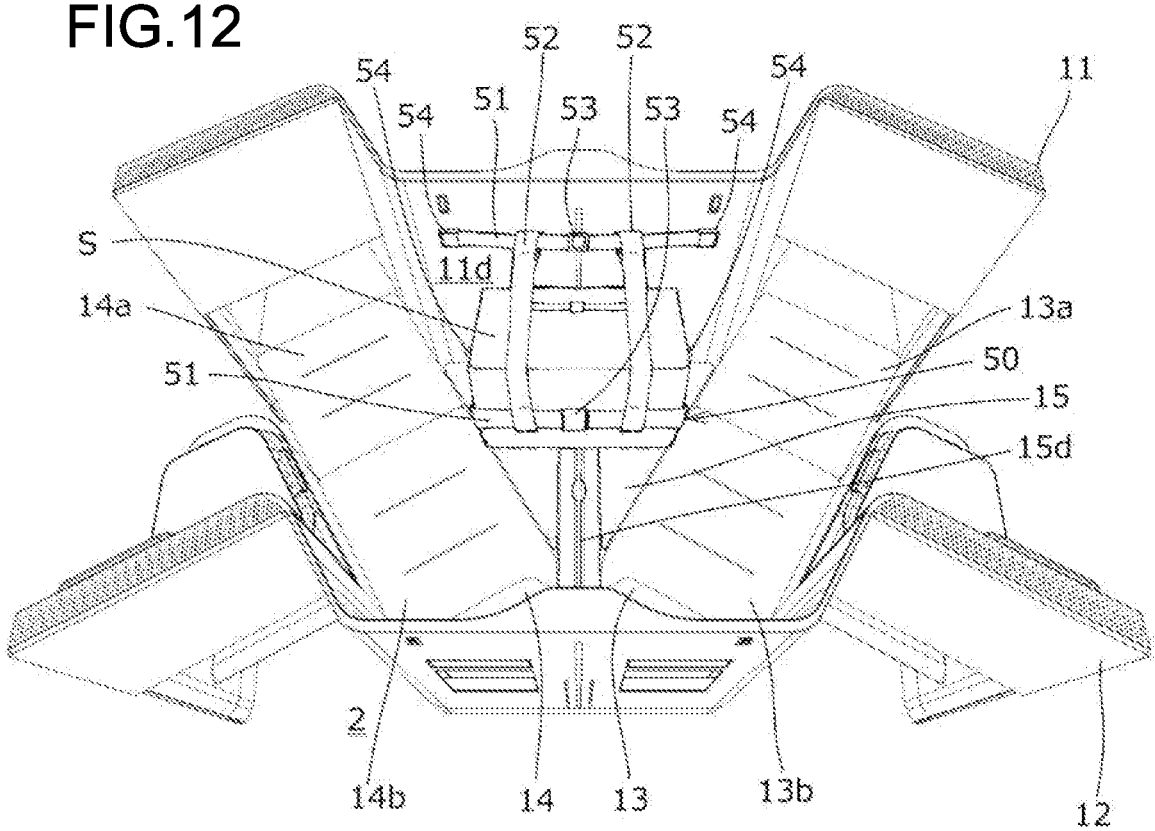
FIG. 12 illustrates a state in which a luggage fixture 50 is attached to the front wall 11, and is a view taken from the same viewpoint as in FIG. 8.

FIG. 12 illustrates a state in which a luggage fixture 50 is attached to the front wall 11, and is a view taken from the same viewpoint as in FIG. 8. The luggage fixture 50, which is an example of a restraining device, has two horizontal belts 51 and two vertical belts 52 with the upper and lower ends attached to the horizontal belt 51. The horizontal belt 51 has an adjustment unit 53 which can adjust the belt length according to the load to be restrained. The luggage serving as the restrained body restrained by the luggage fixture 50 is illustrated here as a case S for a musical instrument, but is not limited thereto.

In addition, at both ends of each horizontal belt 51, an engagement portion 54 is connected. Since the engagement portion 54 has a shared configuration with the engagement portion 32 of FIG. 10, a detailed description thereof will be omitted, but by engaging the engagement portion 54 with the engagement holes 11e (FIG. 10) of the panel 11d, the luggage fixture 50 is firmly connected to the panel 11d.

For example, even if the case S is relatively large in size and heavy in weight, the case S can be safely fixed by using the luggage fixture 50. Accordingly, the case S of a musical instrument or the like brought onto the aircraft can be placed within eyesight of its owner, and the owner can be relieved from the fear of theft or damage. In addition, since most of the weight of the case S is supported by the intermediate portion 15 on which the case S is placed, reinforcement of the panel 11d is unnecessary.

Figure 13:
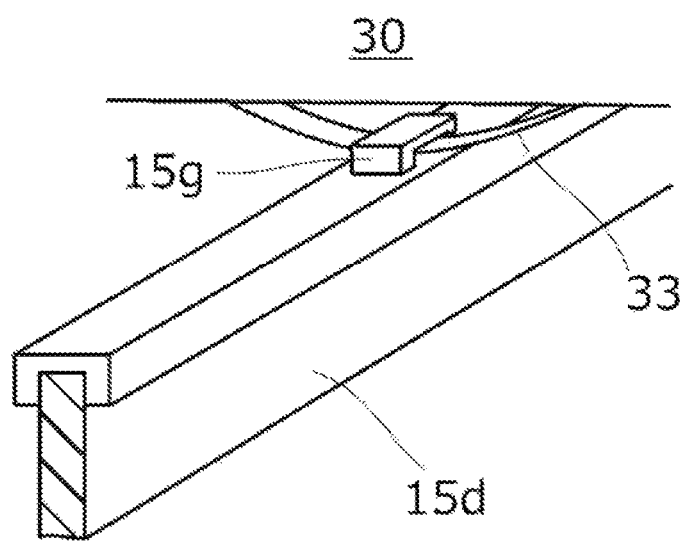
FIG. 13 is a perspective view illustrating a modification of the present embodiment.

FIG. 13 is a perspective view illustrating a modification of the present embodiment. Here, an example in which the bassinet 30 is used as the restraining device is illustrated. Both ends of the fixing belt 33 are attached to the lower surface of the bassinet 30. On the other hand, opposite to this, an L-shaped hook 15g that serves as an auxiliary connection portion is formed on the upper edge of the partition plate 15d. Other than this, the configuration is the same as the above-described embodiment, and therefore the description thereof is omitted here.

In the present modification, first the partition plate 15d is set to an intermediate state between the shielded state and the open state, and the hook 15g is hooked on the center of the fixing belt 33 as illustrated in FIG. 13. Subsequently, while lowering the partition plate 15d together with the bassinet 30, the engagement portion 32 of the bassinet 30 (see FIG. 9) is connected to the panel 11d at a predetermined position, and then the partition plate 15d is completely lowered. In this state, the partition plate 15d may be locked by a known locking mechanism.

In this way, in a state in which the partition plate 15d is housed in the intermediate portion 15 (not illustrated in FIG. 13), the lower surface of the bassinet 30 is fixed to the partition plate 15d via the fixing belt 33, and the bassinet 30 can be held more stably. It should be noted that the hook 15g can also be used in the embodiments of FIG. 11 and FIG. 12 to supplementarily hold the restraining belt 40 and the belt of the luggage fixture 50.

In addition, it is also possible to apply various modifications to the above examples without departing from the scope of the present invention. For example, the height of the support portion 15c may be locked at a position higher than the height of the pedestals 15a and 15b by 10 cm or more. As a result, for example, when the restraining belt 40 is attached to the panel 11d and used, the infant C can straddle the support portion 15c and sit comfortably.

DESCRIPTION OF SYMBOLS

1: Aircraft, 2: floor, 11: front wall, 12: rear wall, 13: first seat, 14: second seat, 15: intermediate portion, 15d: partition plate, 16: first side table, 17: second side table, 30: bassinet, 40: restraining belt, 50: luggage fixture

The invention claimed is:

1. An aircraft seat unit comprising:
a first seat;
a second seat;
an intermediate portion disposed between the first seat and the second seat; and
a wall portion being upright and adjacent to the intermediate portion and extending between the first seat and the second seat,
wherein:
an axis line of the first seat and an axis line of the second seat are respectively disposed at angles that are oriented in mutually opposite directions with respect to a traveling direction;
the intermediate portion is disposed in a space between the first seat and the second seat and is capable of supporting a load of a restrained body placed thereon;
the wall portion includes a wall connection portion detachably connected to a device connection portion of a restraining device that is configured to restrain the restrained body when placed on the intermediate portion;
the intermediate portion includes a pedestal fixed in position to a floor, a support portion capable of being raised and lowered with respect to the pedestal, and a partition plate capable of being raised and lowered;
when the support portion and the partition plate are in a raised state, an upper end of the partition plate is at an elevated position to provide a privacy screen between the first and second seats; and
when the support portion and the partition plate are in a lowered state, a height of an upper surface of the pedestal, a height of an upper surface of the support portion, and a height of the upper end of the partition plate all substantially coincide, and the restraining device is capable of being connected to the wall portion.

2. The aircraft seat unit according to claim 1, wherein:
the support portion and the partition plate are each raised by slidable movement along a vertical axis.

3. The aircraft seat unit according to claim 2, wherein:
the partition plate is telescopically movable in a slot of the support portion, such that in the lowered state the partition plate is nested in the support portion, and in the raised state the partition plate telescopically extends from the support portion.

4. The aircraft seat unit according to claim 3, wherein, in the raised state:
the upper surface of the support portion is raised in a first stage to a first elevation above the pedestal, and the upper end of the partition plate is raised in a second stage to its elevated position at a second elevation that is greater than the first elevation.

5. The aircraft seat unit according to claim 4, wherein, in the raised state:
the elevated position of the upper end of the partition plate is at least at a same elevation as a headrest portion of the first seat and/or second seat to provide the privacy screen.

6. The aircraft seat unit according to claim 5, wherein:
the vertical axis along which the support portion and the partition plate are vertically movable lies in a vertical plane that is perpendicular to the floor, the vertical plane extending in the traveling direction between the first seat and the second seat and intersects with the wall portion;
the wall connection portion is a first wall connection portion, and the device connection portion is a first device connection portion, the wall portion further including a second wall connection portion detachably connected to a second device connection portion of the restraining device, and
the first and second wall connection portions are at the same elevation, the first wall connection portion being on a first side of the vertical plane corresponding with the first seat, and the second wall connection portion being on a second side of the vertical plane corresponding with the second seat, thereby enabling the restraining device to span across the vertical plane into a shared space between the first and second seats when the support portion and partition plate are in the lowered state.

7. The aircraft seat unit according to claim 6, wherein:
the upper end of the partition plate has an auxiliary connection portion for connecting with the restraining device when the support portion and partition plate are in the lowered state and the restraining device is connected to the first and second wall connection portions.

8. The aircraft seat unit according to claim 1, wherein:
a plurality of types of restraining devices for restraining different restrained bodies have a shared device connection portion, and one restraining device of the plurality of types of restraining devices can be selected to connect the device connection portion and the wall connection portion.

9. The aircraft seat unit according to claim 1, wherein:
the restraining device is a bassinet, a restraining belt, or a luggage fixture.

10. The aircraft seat unit according to claim 1, wherein:
the partition plate has an auxiliary connection portion for connection with the restraining device.

* * * * *